United States Patent
Kawase et al.

(10) Patent No.: US 6,232,767 B1
(45) Date of Patent: May 15, 2001

(54) METHOD AND APPARATUS FOR DETECTING WHEEL REVOLUTION USING MAGNETIC FIELD

(75) Inventors: Masahiro Kawase, Higashimatsuyama; Shinichi Tazaki, Isezaki; Hitoshi Kaneko; Hiroshi Sato, both of Tokyo; Norihisa Urayama, Sakado, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/915,858

(22) Filed: Aug. 21, 1997

(30) Foreign Application Priority Data

Aug. 23, 1996 (JP) .................................................... 8-222269

(51) Int. Cl.[7] ........................... G01P 3/487; G01R 33/02; B60C 13/00
(52) U.S. Cl. .......................... 324/174; 324/166; 324/249; 73/514.39; 340/441
(58) Field of Search ............................ 324/160, 163–166, 324/173, 174, 207.13, 207.15–207.22, 207.25, 249, 260; 73/514.39; 180/170; 340/441, 448, 466, 671, 672

(56) References Cited

U.S. PATENT DOCUMENTS

| | | | |
|---|---|---|---|
| 3,662,335 | 5/1972 | Fritze | 340/58 |
| 3,708,750 | * 1/1973 | Bucks et al. | 324/174 X |
| 4,225,006 | * 9/1980 | Murray | 324/174 X |
| 4,570,152 | * 2/1986 | Melton et al. | |
| 5,231,544 | 7/1993 | Matsushige . | |
| 5,461,311 | 10/1995 | Nakazato et al. | 324/207.24 |
| 5,831,432 | * 11/1998 | Mohri | 324/249 |
| 5,895,854 | * 4/1999 | Becherer et al. | 324/174 X |
| 6,028,427 | 2/2000 | Kawase . | |

FOREIGN PATENT DOCUMENTS

| | | | |
|---|---|---|---|
| 3942573A1 | 6/1991 | (DE) | G01P/3/42 |
| 0 590 190 A1 | 4/1994 | (EP) | G01P/3/481 |
| 07181239 | 7/1995 | (EP) | G01R/33/02 |
| 7-181239 | * 7/1995 | (JP) . | |

* cited by examiner

Primary Examiner—Gerard R. Strecker
(74) Attorney, Agent, or Firm—Morgan & Finnegan LLP

(57) ABSTRACT

A tire (12) used includes a steel belt in its outer circumferential portion. A magnetic sensor (14) including a pair of magnetic detection elements (18A, 18B), which are arranged so that their magnetic detection directions become parallel to each other or series each other, is set in the vicinity of a rear tire (12) in a trunk room of a vehicle (10). Changes in magnetic field upon revolution of the tire (12) are differentially detected by the magnetic detection elements (18A, 18B), and the revolution of the tire (12) is detected on the basis of the differentially detected output waveform. Among a plurality of peaks present in the differentially detected output waveform, a peak, the potential difference from the immediately preceding peak of which is equal to or larger than a predetermined threshold value, is detected as an effective peak, which is effective for tire revolution detection, and the revolution speed of the tire is calculated by detecting the number of effective peaks.

9 Claims, 9 Drawing Sheets

METHOD AND APPARATUS FOR DETECTING WHEEL REVOLUTION USING MAGNETIC FIELD

BACKGROUND OF THE INVENTION

1. Field of the Invention

The present invention relates to a tire revolution detection method and apparatus for detecting the revolution of a tire and a tire revolution speed detection method and apparatus for measuring the speed, traveled distance, and the like of a vehicle such as an automobile or the like on the basis of the tire revolution per minute (rpm) of the vehicle and, more particularly, to a wheel revolution detection method and apparatus, a tire revolution detection method and apparatus, and a tire revolution speed detection method, which magnetically detect the revolution or revolution speed of a wheel or tire.

2. Description of the Related Art

Car navigation systems used for confirming the current position of a vehicle, navigating a vehicle, and so on have come into existence in about 1990, and have become popular.

A car navigation system has a function of detecting absolute position on the basis of radio waves from a satellite by GPS (GLOBAL POSITIONING SYSTEM) navigation. In recent years, systems using a hybrid system with a self-contained navigation that indicates the traveling condition of a vehicle on the basis of the angular deviation detected by a gyro sensor and vehicle speed data from the vehicle main body have increased and become dominant. The hybrid system can improve map matching precision.

However, in order to obtain the self-contained navigational function, vehicle speed data must be acquired from the vehicle main body. For this purpose, a user must ask an expert having the diagram of the vehicle main body for connecting the system. Such connections are hard to do by a normal user, and high cost and connections requiring an expert prevents wider user of car navigation systems in future.

SUMMARY OF THE INVENTION

The above-mentioned problems can be solved if a sensor that detects the revolution or revolution speed of a tire to measure the vehicle speed or traveled distance, and can be easily attached can be supplied. As an ideal method, it is most preferable to detect the revolution or revolution speed of the tire in a non-contact manner.

Figure 10:
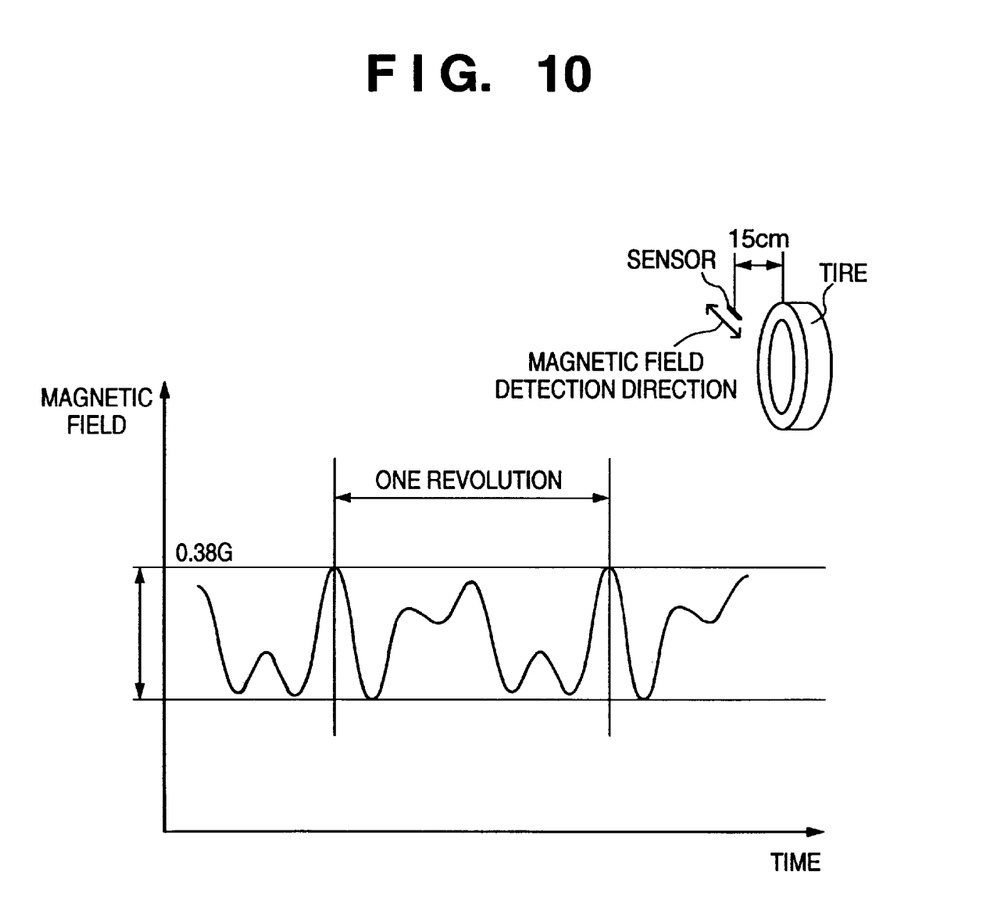
FIG. 10 is a waveform chart showing the measurement result of changes in magnetic field upon revolution of a tire.

The present inventors considers the fact that steel radial tires have become popular, and such tire has a steel belt inside the outer circumferential portion. The present inventors postulated that the steel belt has residual magnetization albeit its weak strength, and this residual magnetization radiates a magnetic field outside the tire. In fact, when the magnetic field was measured by revolving the tire once, a magnetic field distribution shown in FIG. 10 appeared. The measurement was done along the outer circumferential portion at a position about 15 cm from the tire. As shown in FIG. 10, a clear peak is present in correspondence with one revolution of the tire, and feasibility of magnetic detection of the revolution of the tire is suggested.

However, the peak-to-peak value of the magnetic field from the tire is 0.38 G, and is smaller than geomagnetism (about 0.5 G). In some cases, the magnetic field may become smaller than 0.1 G depending on the types of tires and the setting positions of the sensor.

In order to satisfactorily obtain magnetic detection of the revolution or revolution speed of such tire, the following conditions must be satisfied.

i) Sensor Arrangement

The sensitivity of a magnetic sensor requires several mG in consideration of resolution. On the other hand, A state of the sensor caused by magnetization does not change such as a flux gate sensor.

ii) Sensor Setting

The sensor must be easy to set in a vehicle. Also, the sensor must be set at a position suitable for magnetic field detection.

iii) Removal of Influences of Disturbances

The influences of magnetic fields that act as disturbances produced by residual magnetic fields of iron reinforcing rods, steel frames, and the like of bridges, tunnels, and the like must be removed.

It is an object of the present invention to provide a tire revolution detection method and apparatus, which can satisfy the above-mentioned conditions, and satisfactorily attain magnetic detection of the revolution of a tire, and a tire revolution speed detection method, which can satisfactorily attain magnetic detection of the revolution speed of the tire.

In order to achieve the above object, a wheel revolution detection method according to the present invention adopts a wheel revolution detection method for detecting a revolution of a wheel provided to a vehicle, comprising the steps of:

using the wheel provided with magnetic field generation means for generating a magnetic field;

setting magnetic field detection means inside the vehicle for detecting the magnetic field generated by the magnetic field generation means; and detecting revolution of the wheel by detecting a change in magnetic field upon revolution of the wheel by the magnetic field detection means.

According to this method, since the magnetic field detection means can be easily attached to the vehicle to detect the revolution of the wheel, even an average user can easily attach the magnetic field detection means to detect the revolution of the wheel.

A wheel revolution detection apparatus according to the present invention adopts a wheel revolution detection apparatus for detecting a revolution of a wheel provided to a vehicle, comprising:

magnetic field generation means, provided to a member which rotates together with at least one wheel, for generating a magnetic field; and magnetic field detection means for detecting the magnetic field generated by the magnetic field generation means, wherein the magnetic field detection means is arranged inside the vehicle.

With this arrangement, since the magnetic field generation means is attached to the member which rotates together with at least one wheel, and the magnetic field detection means is attached inside the vehicle body, the wheel revolution detection apparatus can be easily arranged on the vehicle. Since the wheel revolution detection apparatus is additionally attached in this manner, when the user attaches a car navigation system, he or she can easily attach the car navigation system without specifying external terminals of a traveled distance sensor and the like, which are arranged in advance. Also, since the magnetic field detection means is arranged inside the vehicle body, it is hardly influenced by rainwater and the like, and can be also prevented from external damages.

A wheel revolution detection apparatus according to the present invention adopts a wheel revolution detection apparatus for detecting a revolution of a wheel provided to a vehicle, comprising:

magnetic field detection means for detecting a magnetic field generated by magnetic field generation means provided to a member which rotates together with at least one wheel, wherein the magnetic field detection means is arranged inside the vehicle.

With this arrangement, since the magnetic field detection means for detecting the magnetic field generated by the magnetic field generation means attached to the member which rotates together with at least one wheel is attached inside the vehicle body, the wheel revolution detection apparatus can be easily arranged on the vehicle. In this manner, since the wheel revolution detection apparatus is additionally arranged, when the user himself or herself attaches a car navigation system, he or she can easily attach the car navigation system without specifying external terminals of a traveled distance sensor and the like, which are arranged in advance. Also, since the magnetic field detection means is arranged inside the vehicle body, it is hardly influenced by rainwater and the like, and can be also prevented from external damages.

According to the present invention, a tire revolution detection method for detecting revolution of a tire by detecting a magnetic field generated by the tire of a vehicle using a magnetic sensor, comprises the steps of:

using, as the tire, a tire which includes a steel belt in an outer circumferential portion thereof;

setting the magnetic sensor including a pair of magnetic detection elements, which are arranged so that magnetic detection directions thereof become parallel to each other or series each other, in the vicinity of a rear tire in a cabin or trunk room of the vehicle; and detecting a change in magnetic field upon revolution of the tire by the pair of magnetic detection elements, and detecting the revolution of the tire on the basis of an output of the detection.

According to this method, since the magnetic sensor is set in the vicinity of a rear tire inside the cabin or trunk room of the vehicle, the magnetic sensor can be easily set, and can satisfactory detect the magnetic field from the tire. Differential detection can remove the influences of disturbance magnetic fields. When the magnetic detection element especially comprises a magnetic impedance element, changes in weak magnetic field can be detected at high sensitivity, and such element is free from changes in state caused by magnetization, thus allowing highly reliable detection.

According to a tire revolution speed detection method of the present invention, the tire revolution detection method of the present invention is used, a peak, a potential difference from the immediately preceding peak of which is equal to or larger than a predetermined threshold value, among a plurality of peaks present in the output waveform of the differential detection is detected as an effective peak, which is effective for tire revolution detection, and the tire revolution speed is calculated based on the number of detected effective peaks.

According to this method, the influences of the disturbance magnetic fields can be nearly completely removed, and only the magnetic field from the tire can be detected. Also, detection can be done independently of the revolution speed of the tire, and tire revolution speed detection with small errors can be realized. Note that the traveled distance of the vehicle can be calculated as a product of the detected revolution speed, the diameter of the tire and the ratio of the circumference of a circle to its diameter.

Furthermore, according to the present invention, a tire revolution detection apparatus for detecting a revolution of a tire by detecting a magnetic field generated by the tire of a vehicle, comprises:

a pair of magnetic detection elements which are arranged so that magnetic detection directions thereof become parallel to each other or series each other;

a circuit for driving the pair of magnetic detection elements and extracting detection signals from the pair of magnetic detection elements;

a differential amplifier circuit for differentially amplifying the detection signals of the pair of magnetic detection elements extracted by the circuit;

an A/D converter for A/D-converting a differential output from the differential amplifier circuit; and a microcomputer for processing an output from the A/D converter, wherein the microcomputer detects a peak in a waveform of the differential output on the basis of a presence/absence of reversal of a change direction of output data from the A/D converter, determines the peak, a potential difference from an immediately preceding peak of which exceeds a predetermined threshold value, as an effective peak effective for tire revolution detection, and outputs a pulse in correspondence with a determination result of the effective peak.

With this arrangement, tire revolution detection can be satisfactorily done using the entire apparatus or the arrangement from at least the pair of magnetic detection elements to the differential amplifier circuit as the magnetic sensor in the above-mentioned tire revolution detection method of the present invention.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The preferred embodiment of a tire revolution detection method and apparatus, and a tire revolution speed detection method according to the present invention will be described hereinafter with reference to the accompanying drawings.

Figure 1A:
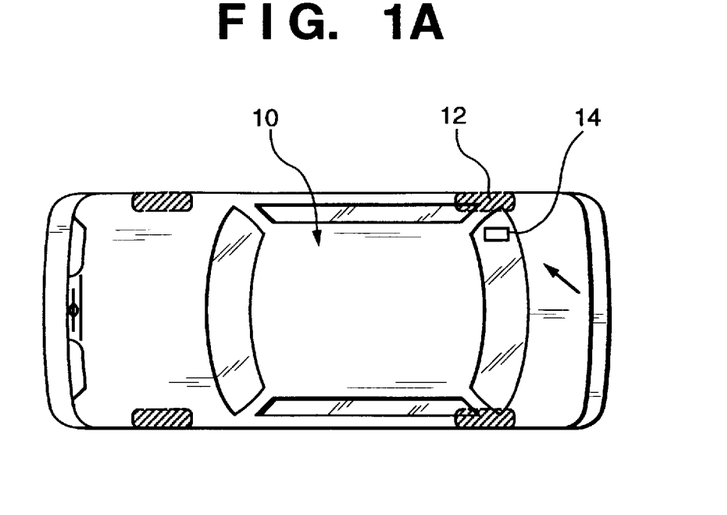
FIG. 1A is a top view of a vehicle showing the setting position of a magnetic sensor and the layout of magnetic detection elements (MI elements) in the vehicle according to an embodiment of the present invention.

In the embodiment of the present invention, in a vehicle 10 shown in FIG. 1A, a tire 12 uses a steel radial tire which has a steel belt which serves as a magnetic field generation means inside the outer circumferential portion, and a magnetic sensor 14 serving as a magnetic field detection means is set in the vicinity of the rear side of the rear tire 12 in a trunk room or cabin of the vehicle 10. The magnetic sensor 14 may be set at the rear side of either the right or left rear tire 12. The sensor can be set at the front tire side. In this case, however, since the distance between the tire and the sensor is not constant due to changes in angle of the tire upon operation of a steering wheel, the output waveform of the sensor drifts. Hence, this position is not suitable.

Note that the above description applies to a front-wheel driven vehicle, and the tire relationship is reversed in the case of a rear-wheel driven vehicle. That is, the sensor need only be set in the vicinity of a tire which is not steered. With this arrangement, since the changes in relative position between the steel belt (magnetic field generation means) and the magnetic sensor (magnetic field detection means) become small, stable magnetic field detection is attained.

In the above description, the steel belt is exemplified as the magnetic field generation means. Alternatively, another magnetic member inside a wheel to which the tire is attached may be used as the magnetic field generation means by, e.g., magnetizing a disk, wheel, or the like that constitute a braking device, or fixing a magnet.

Figure 1B:
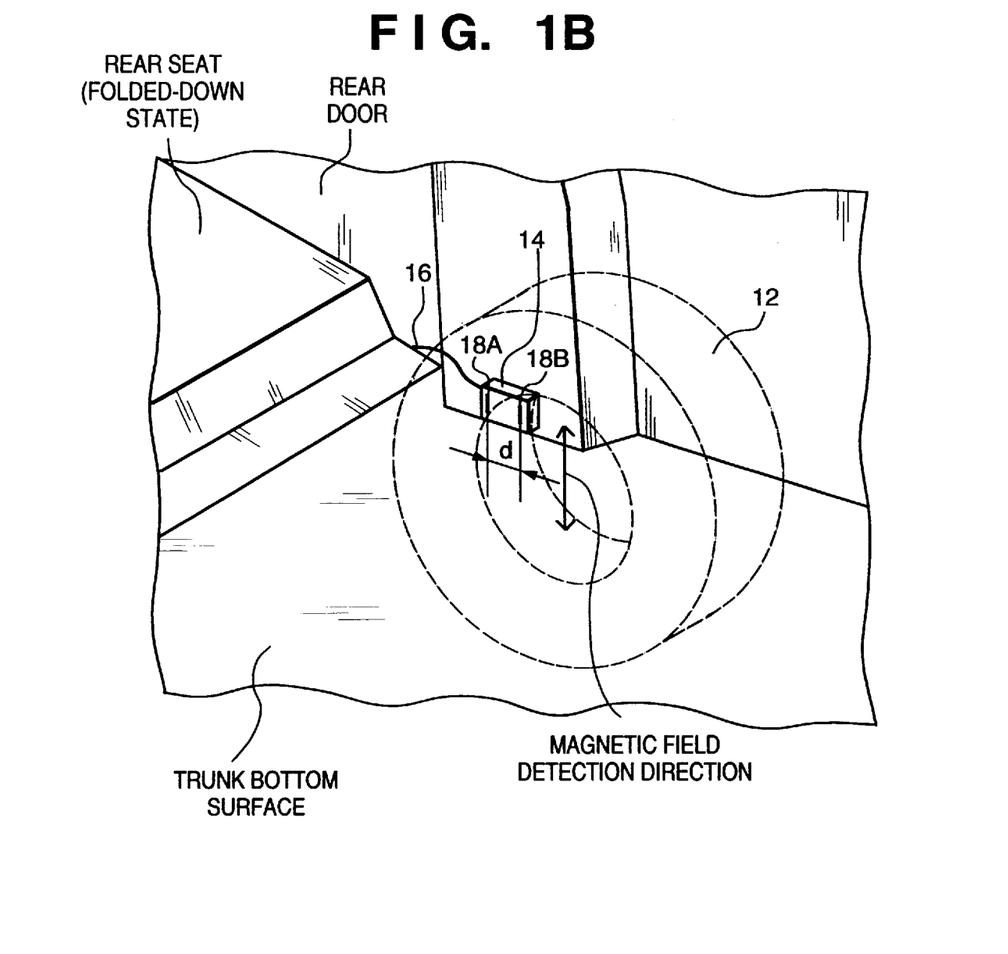
FIG. 1B is a perspective view of the interior of a trunk room of the vehicle showing the setting position of the magnetic sensor and the layout of the magnetic detection elements (MI elements) in the vehicle according to the embodiment of the present invention.

The setting position will be described in detail below with reference to FIG. 1B as an enlarged perspective view along the arrow in FIG. 1A. As shown in FIG. 1B, the sensor 14 is set at a position on a trunk side wall or bottom wall, which corresponds to the vicinity of the rear side of the tire 12 and is separated about 15 cm from the outer circumferential portion of the tire 12. FIGS. 1A and 1B exemplify a passenger vehicle. Also, even in light cars, vans, recreational vehicles, a setting space is present in a cabin or trunk on the rear side of the rear tire, and a distance within 30 cm from the outer circumferential portion of the tire can be assured. Note that the sensor may also be arranged in the vicinity of a tire housing in a rear trunk.

The sensor is connected to a car navigation apparatus main body via a cable 16. Unlike a sensor arranged outside the vehicle body, the cable 16 can be easily extended via the cabin toward the car navigation apparatus main body.

The arrangement of the magnetic sensor 14 will be described below. The magnetic sensor 14 comprises a pair of magnetic detection elements 18A and 18B. As the magnetic detection elements 18A and 18B, a magnetic impedance element (to be abbreviated as an MI element hereinafter) which is disclosed in Japanese Patent Laid-Open No. 7-181239 and uses the magnetic impedance effect is suitable. The magnetic impedance effect is a phenomenon in which when RF currents in the MHz band are applied to an amorphous wire or magnetic thin film, the impedance across the two ends of a magnetic member which is made of either the amorphous wire or the magnetic thin film, changes several 10% by an external magnetic field, and the MI element has a practical sensitivity of several mG or more.

The MI element has the following advantages: the MI element has a sensitivity equal to or higher than a flux gate sensor and allows easy size reduction to a length of about several mm; and the MI element is strong against magnetization (meaning it is a high impedance against becoming magnetized by a strong external magnetic field) and operates stably under the circumstance that the external magnetic field changes to a large extent. Hence, the MI element is suitable for the sensor of this embodiment.

In this sensor, in order to eliminate the influences of external magnetic fields and to detect only the magnetic field from the tire, the two MI elements 18A and 18B are differentially operated. In order to effectively attain such differential operation, the two elements 18A and 18B are set so that their magnetic detection directions become parallel to each other or series each other. As for setting of the magnetic field detection direction, the magnetic field detection direction is set in a direction perpendicular to the trunk bottom surface, as indicated by an arrow in FIG. 1B. However, even if the magnetic field detection direction is set in other directions, there is no particular difference, and any directions may be selected.

Figure 2:
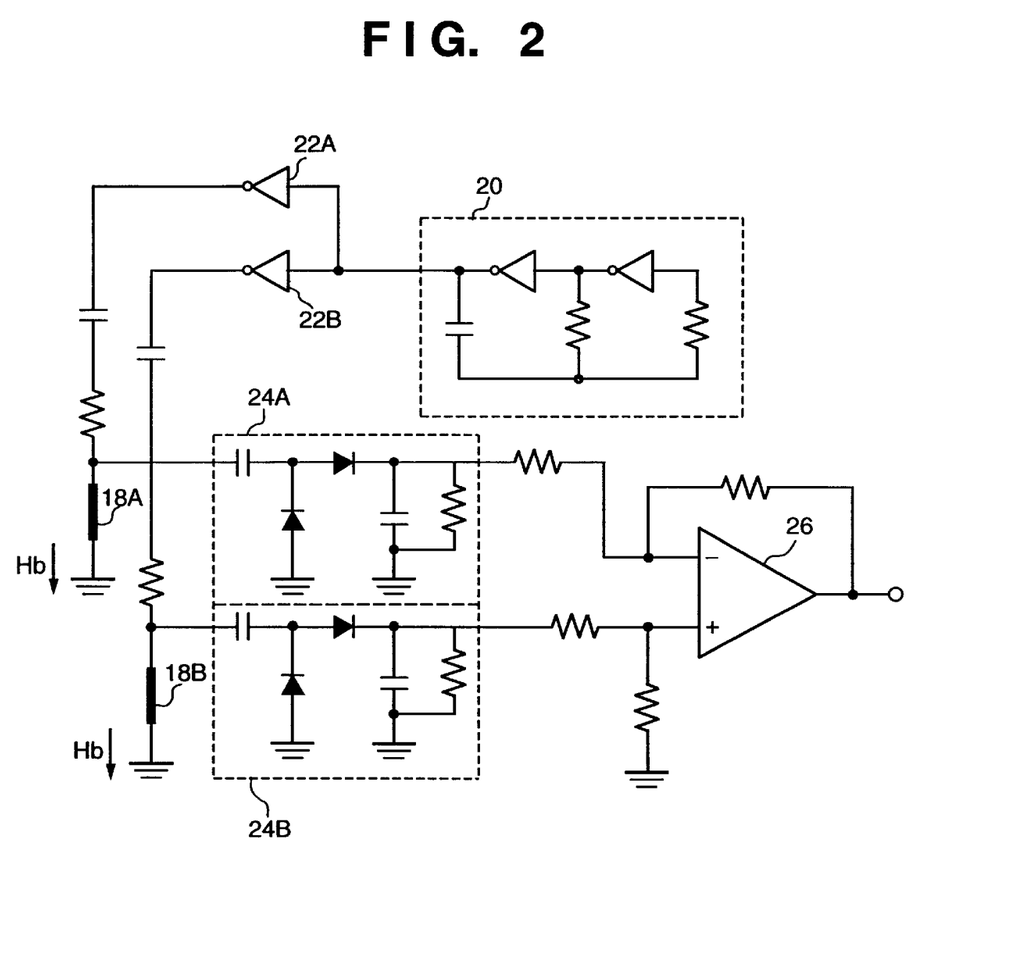
FIG. 2 is a circuit diagram showing the arrangement of a magnetic detection circuit of the magnetic sensor of the embodiment shown in FIGS. 1A and 1B.

A magnetic detection circuit of the magnetic sensor 14 for detecting the magnetic field from a tire using the MI elements 18A and 18B has an arrangement, as shown in FIG. 2. In this magnetic detection circuit, an RF oscillation circuit 20 applies RF currents to the MI elements 18A and 18B via buffers 22A and 22B, thereby driving the MI elements 18A and 18B. The other end sides of the MI elements 18A and 18B are grounded. Changes in external magnetic field change the impedance of the MI elements 18A and 18B, and a voltage across the two terminals of each of the MI elements 18A and 18B changes. Signals indicating such changes in voltage are respectively detected by two detecting circuits 24A and 24B and are output as magnetic detection signals of the MI elements 18A and 18B. These detection signals are input to a differential amplifier circuit 26 and are differentially amplified. Note that a permanent magnet or coil applies a DC bias or magnetic field Hb of about 1 to 2 G to the MI elements 18A and 18B to assure sensitivity.

Figure 3:
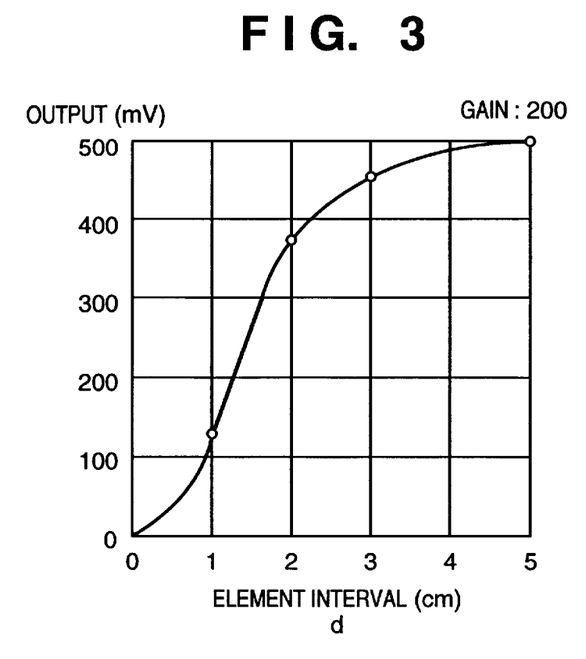
FIG. 3 is a graph showing the relationship between the interval d between the MI elements and the magnetic detection output of the magnetic sensor.

If the interval d between the MI elements 18A and 18B shown in FIG. 1B is too small, their outputs drop. Therefore, an appropriate interval must be selected. To this end, the magnetic field detection outputs upon revolution of the tire were measured by changing the interval d. As a result, as shown in FIG. 3, the output as a peak-to-peak value sharply drops when d<2 cm, but a practical output is obtained when d≧2 cm.

Figure 4:
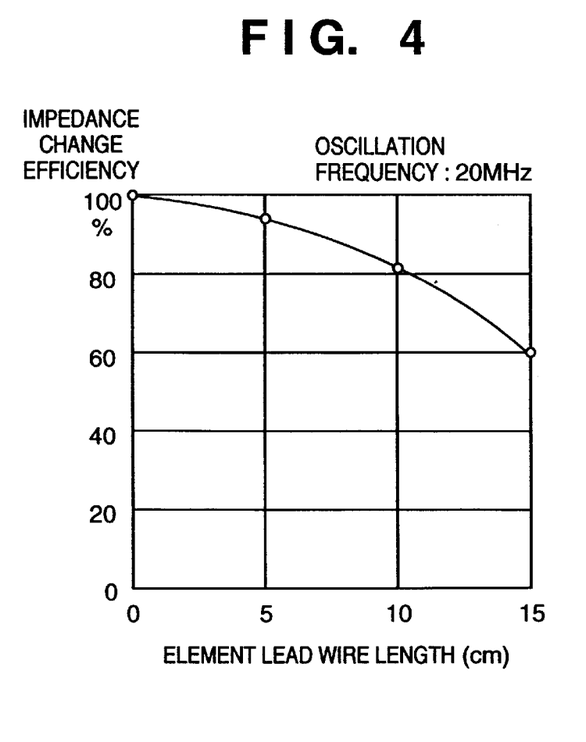
FIG. 4 is a graph showing the relationship between the lead wire length of the MI elements and the impedance change efficiency of the magnetic sensor.

When lead wires for connecting the MI elements to the magnetic detection circuit to apply RF currents to the MI elements 18A and 18B become too long, unwanted impedance components such as a floating capacitance and the like increase, and the impedance change efficiency drops with increasing lead wire length, as shown in FIG. 4. For this reason, if a drop to about 80% is allowed, a maximum lead wire length for each element is 10 cm, and the interval d between the elements should be set to be 20 cm or less. Hence, the interval d is preferably set to fall within the range from 2 cm to 20 cm.

The measurement result of the sensor differential output when the tire is actually rotated with the abovementioned sensor arrangement and layout will be explained below.

Figure 5:
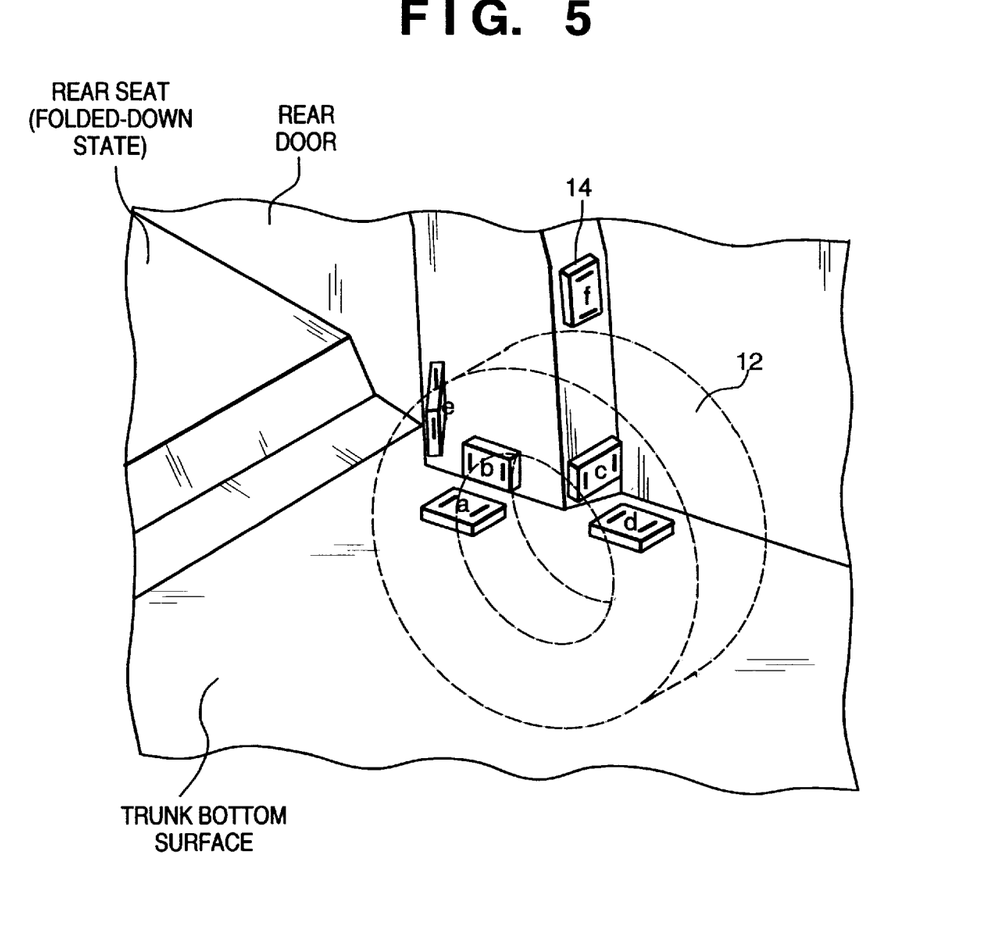
FIG. 5 is a perspective view of the interior of the trunk room showing different setting positions (measurement points) of the magnetic sensor in magnetic field change measurement tests upon revolution of a tire.
Figure 6:
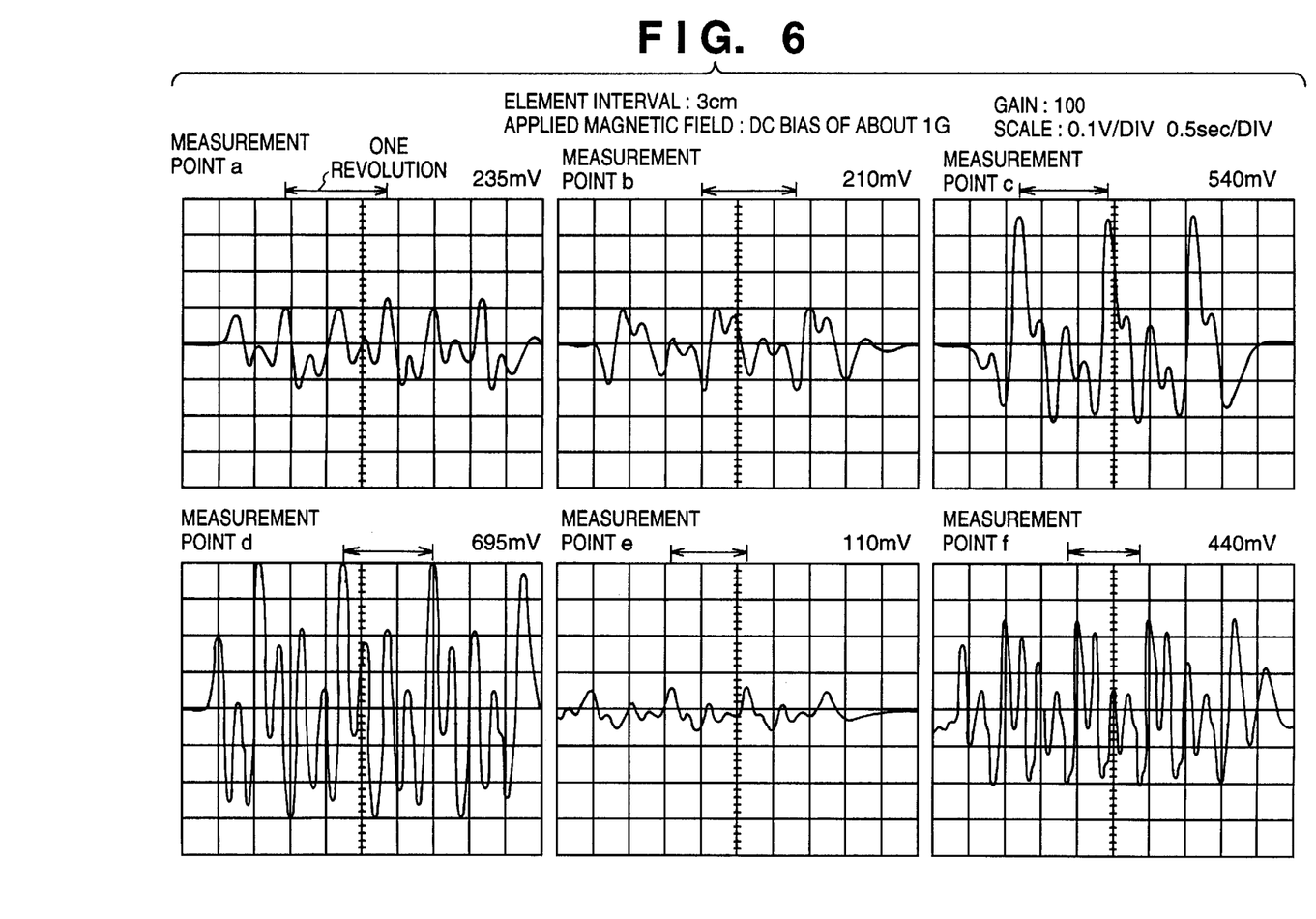
FIG. 6 shows oscillographs of the measurement results at the individual measurement points in the tests.

For measurements, a magnetic sensor, which used, as the MI elements 18A and 18B, two elements prepared by patterning an Fe—Ta—C-based magnetic thin film (thickness=2 $\mu$m) on a glass substrate, and set the elements at an interval d=3 cm, was fabricated. As the magnetic detection circuit, the circuit described above with the aid of FIG. 2 was used, and was built in the sensor. The magnetic sensor 14 was set at six points (a) to (f) in the vicinity of the rear side of the rear tire 12 in the trunk room, as shown in FIG. 5, and the differential outputs were measured. The measurement conditions were: RF currents of 20 MHz were applied to the MI elements 18A and 18B while applying a DC bias magnetic field of 1 G thereto, and the gain of the differential amplifier circuit 26 was set to be 100. FIG. 6 shows the measurement results.

The waveform at the point (a) will be explained below. The range indicated by a double-headed arrow corresponds to one revolution, and four each positive and negative peaks are present within that range. Of these peaks, two positive peaks are large ones. The S/N ratio is satisfactory.

At the point (b), the waveform is similar to that at the point (a) although the magnetic field detection direction is different from (a) by 90° and the polarities of peaks are vertically inverted in relation to the polarity of the bias magnetic field.

At the points (c), (d), and (f), the outputs are twice or more than-the point (a) since these points are closer to the outer circumferential portion of the tire than the point (a).

Conversely, at the point (e), the output is about half that at the point (a) since the point (e) is farther than the point (a).

The low output can be compensated for by increasing the amplifier gain. However, the low output is originally accounted for by a small magnetic field from the tire, and a large difference between that magnetic field and an external magnetic field cannot be assured, resulting in large variations of the waveform.

Hence, as the setting position of the sensor, a position as close as possible to the outer circumferential portion of the tire where the steel belt is buried should be selected to assure a high output.

In view of-the above-mentioned facts, a sensor arrangement that can detect the magnetic field from a tire at high sensitivity, and a preferred setting position of the sensor have been found. A method of detecting the revolution speed of a tire will be described below.

FIG. 6 shows the measurement results of the magnetic field from the tire in a stable situation free from any disturbance magnetic field. In this situation, it is easy to count zero—crossing points or points crossing a certain threshold value, and to calculate the revolution speed from the number of pulses per revolution.

However, in actual vehicle maneuvering, swell-like level drifts are produced in the output waveform due to the influences of residual magnetization of the iron reinforcing rods, steel frames, and the like of bridges, tunnels, and the like, positional drifts between the tire and sensor due to vibrations of the vehicle, the influences of residual magnetization of vehicles traveling in the opposite lane, and the like. It is not easy to calculate the revolution speed from the sensor output waveform suffering such drifts.

Figure 7:
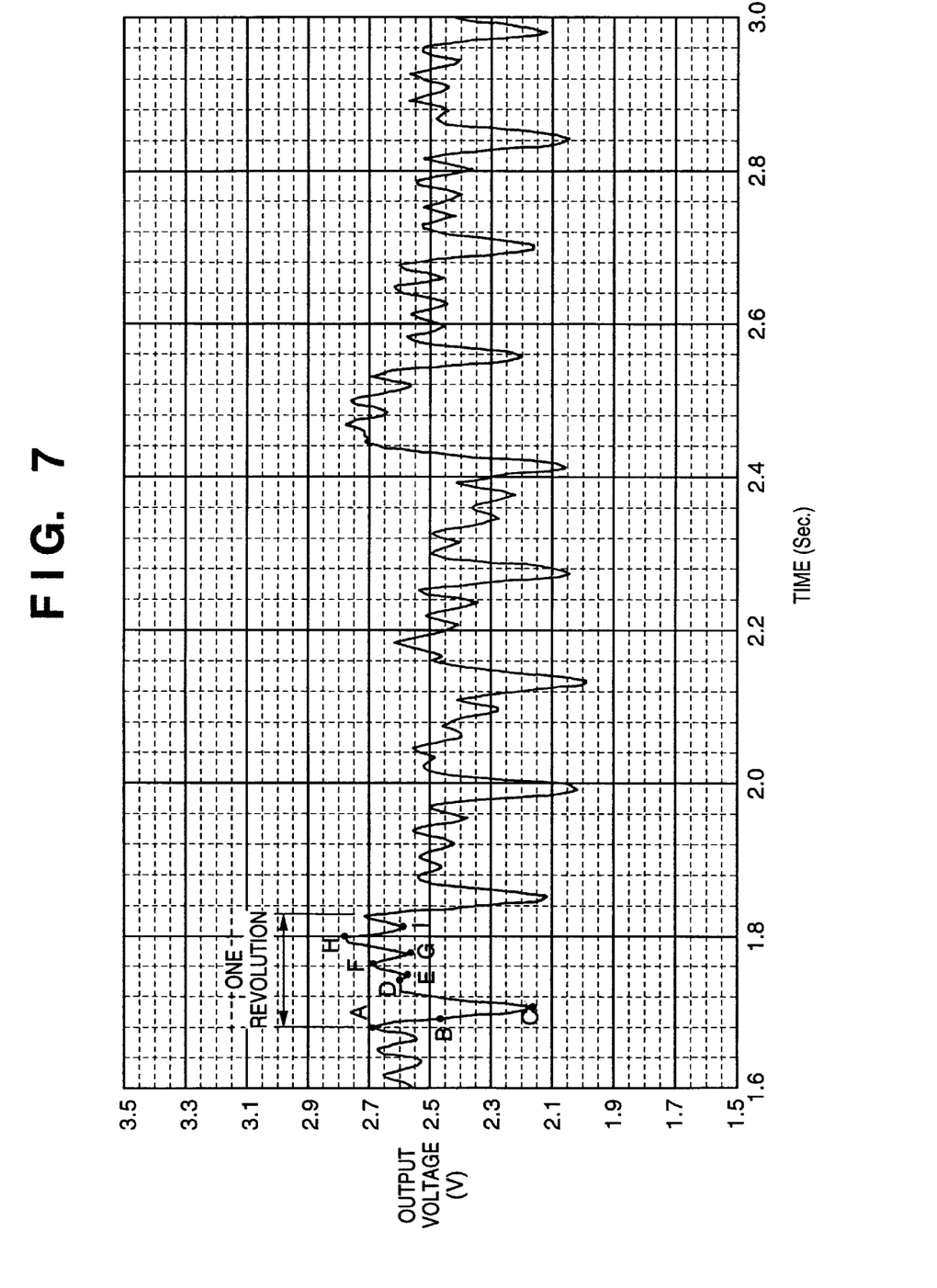
FIG. 7 is a waveform chart of the operation output showing the measurement result of changes in magnetic field upon revolution of the tire when a vehicle travels on a bridge.

FIG. 7 shows, as an example, continuous data obtained by measuring changes in magnetic field upon revolution of the tire when the vehicle travels on a certain bridge at about 50 km/h. This data forms a waveform having a single large peak indicated by a point C per revolution of the tire, and if this peak can be reliably detected, the revolution speed can be accurately detected, and the speed and traveled distance can be calculated.

However, as can seen from the whole waveform, the waveform swells, and how to deal with this swell is the question. This swell is-the influence of the iron reinforcing rod or steel frame of the bridge, and a magnetic disturbance due to the residual magnetization of such structure produces the swell on the output waveform. Although the sensor performs differential operations to eliminate the influences of the disturbance, the influences of the disturbance cannot be removed completely.

Since this swell is formed by frequency components lower than those forming the output waveform upon revolution of the tire, a method of removing the swell by a high-pass filter, and counting zero-crossing points or crossing points at a certain threshold values has been examined. However, since the vehicle speed is required to fall within the range from the speed equal to or lower than the walking speed of a human being to about 200 km/h in high-speed performance, the frequency band from nearly DC to about 200 Hz must be taken into consideration, and a plurality of filters must be prepared. In addition, the S/N ratio drops due to decreases in output obtained via the filter at a constant speed.

In view of these problems, the present invention adopts the following method. That is, the output waveform is sequentially converted into numerical data, and a peak of the output waveform is detected by checking using a microcomputer if changes (increment or decrement) in data have been inverted. Whether or not the potential difference between that peak and the immediately preceding peak exceeds a predetermined threshold value is checked to determine if that peak is an effective peak suitable for detecting the tire revolution. By counting the effective peaks, the revolution speed of the tire is calculated, and the traveled distance or speed is calculated based on the diameter of the tire and the ratio of the circumference of a circle to its diameter.

According to this embodiment, the influences of disturbances as relatively low frequency components in the output waveform can be nearly completely removed, and tire revolution can be detected independently of the speed.

Figure 8:
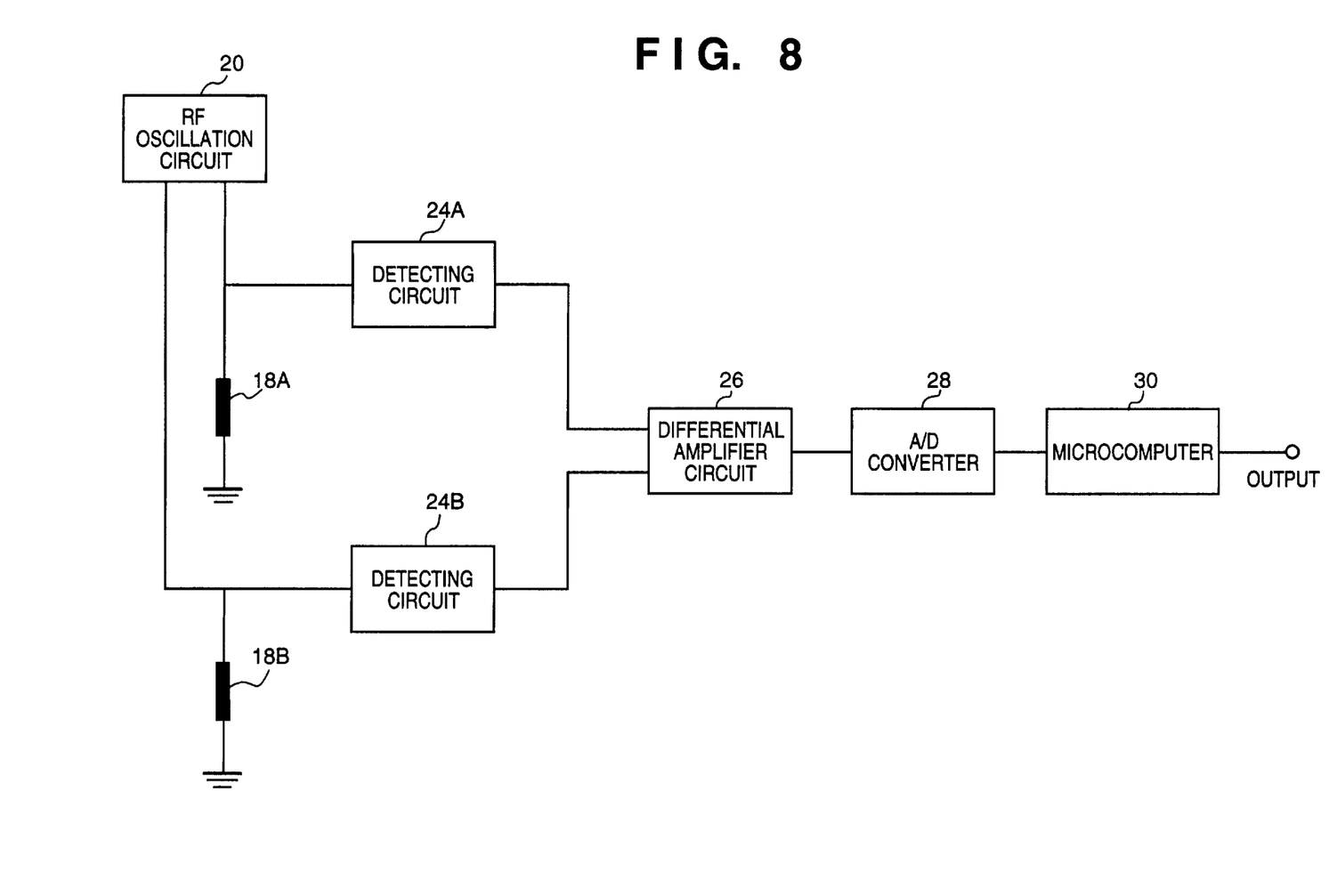
FIG. 8 is a block diagram showing the overall arrangement of an embodiment of a tire revolution detection apparatus.

FIG. 8 shows the arrangement of a tire revolution detection apparatus for detecting the tire revolution by the above-mentioned method. In the arrangement shown in FIG. 8, an arrangement from the MI elements 18A and 18B to the differential amplifier circuit 26, i.e., the arrangement of the magnetic detection circuit shown in FIG. 2, may be used as the magnetic sensor 14, or the arrangement of the overall apparatus shown in FIG. 8 may be used as the magnetic sensor 14.

In the arrangement shown in FIG. 8, as described above, RF currents output from the RF oscillation circuit 20 are applied to the MI elements 18A and 18B, and signals representing changes in voltage across the two terminals of each of the MI elements 18A and 18B are supplied to the detecting circuits 24A and 24B to remove high-frequency components to output magnetic detection signals. These detection signals are input to the differential amplifier circuit 26 and are differentially amplified. Thereafter, the differential output is converted from an analog signal into a digital signal (to be referred to as A/D-conversion hereinafter) by an analog-to-digital (A/D) converter 28. The digital signal is input to a microcomputer 30, and the microcomputer 30 performs the above-mentioned peak detection and effective peak determination on the basis of the digital signal.

The processing after the A/D conversion will be described in detail below with reference to the flow chart in FIG. 9 and the differential output signal waveform chart in FIG. 7.

Figure 9:
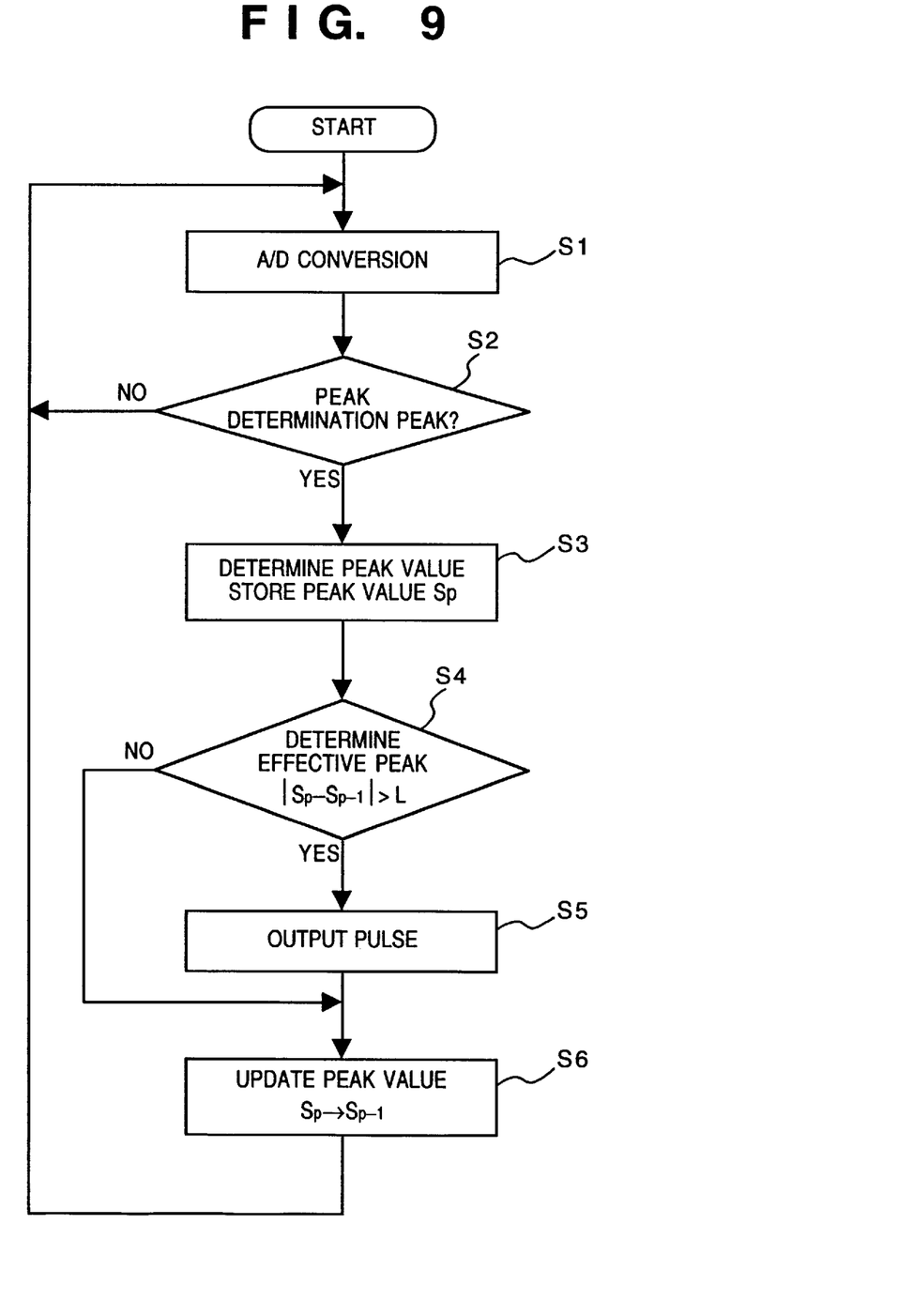
FIG. 9 is a flow chart showing the signal processing procedure by a microcomputer 30 in FIG. 8.

In the processing shown in the flow chart in FIG. 9, the differential output voltage from the sensor is A/D-converted by the A/D converter 28 in step SI, and the digital signal is input to the microcomputer 30.

It is checked in step S2 if the data input in step S1 corresponds to a peak. This checking step is attained by determining whether or not the change direction of the latest data from the second latest data is reversed from positive (increment) to negative (decrement) or vice versa with respect to the change direction of the second latest data from the third latest data. If N (NO) in step S2, the flow returns to step S1; otherwise, the flow advances to step S3.

For example, it is determined that a point B in the differential output waveform shown in FIG. 7 is not a peak, since the change direction remains negative (decrement), and the flow returns to step S1 to A/D-convert the next data. Thereafter, when data at a point C is converted into numerical data, reversal of the change direction from negative to positive is detected, and it is determined that the data at the point C is a peak. Then, the flow advances to step S3.

In step S3, for example, the data at the point C, which is determined to be a peak, is stored as a peak value Sp in, e.g., the internal RAM or the like of the microcomputer 30.

In step S4, whether or not the absolute value of the difference between the current peak value Sp and the previous peak value Sp-1 exceeds a predetermined threshold value L is checked to determine if the data of the peak value Sp is an effective peak effective for tire revolution detection. The relationship between the peak values Sp and Sp-1 in, e.g., FIG. 7 is that if Sp is the point C, Sp-1 is the point A; if Sp is the point D, Sp-1 is the point C.

The threshold value L is set to remove very small peaks since they have a low S/N ratio and are weak against disturbances, and to pick up relatively large peaks so as to assure high reliability. Needless to say, if a small threshold value L is set, small peaks can be detected; if a large threshold value L is set, large peaks alone are detected. Hence, the threshold value L can be set in correspondence with the output waveform that changes depending on the magnetization state of the steel belt of the tire and the setting position of the sensor. The threshold value L is preferably set to fall within the range from 10% to 90% of a maximum interpeak (two consecutive peaks) potential difference since variations in the output waveform itself are about 10% with reference to the maximum interpeak potential difference measured in advance.

In the example shown in FIG. 7, in the entire waveform, the maximum interpeak potential difference is about 0.5 V. In this case, if the threshold value L is set at 0.3 V (60% of 0.5 V) to determine an effective peak, the difference between the peak C and the immediately preceding peak A is about 0.55 V and exceeds 0.3 V of the threshold value L, and it is determined that the peak C is an effective peak. However, in the case of a peak E, since the difference from the immediately preceding peak D is about 0.02 V and does not exceed the threshold value L, the peak E is ignored. Hence, within the range corresponding to one revolution of the tire indicated by the arrow in FIG. 7, two peaks C and D are determined to be effective peaks.

Referring back to FIG. 9, if an effective peak is determined in step S4, the output pin of the microcomputer 30 outputs a pulse signal with a small pulsewidth in step S5. This pulse is output to inform the car navigation apparatus main body of the detection of an effective peak. As another output pattern of the pulse signal, a pulse signal may be inverted every time an effective peak is determined.

The flow then advances from step S5 to step S6. On the other hand, if it is determined in step S4 that the data of interest is not an effective peak, the flow also advances to step S6. In step S6, the current peak value Sp is stored in the RAM as the previous peak value Sp-1 to update the peak value Sp-1. Thereafter, the flow returns to A/D conversion in step S1 to repeat the above-mentioned processing.

Since the peak detection and effective peak determination in the above-mentioned processing do not include any time parameters, tire revolution detection can be made independently of the revolution speed of the tire. Hence, a predetermined detection performance can be assured even when the vehicle speed changes from a very low speed to a high speed.

In the above processing, the number of pulses output in step S5, i.e., the number of detected effective peaks may be counted, and the revolution speed of the tire may be calculated based on the count value. Furthermore, the traveled distance of the vehicle may be calculated by multiplying the calculated revolution speed by the diameter of the tire and the ratio of the circumference of a circle to its diameter. In this case, since one pulse does not always correspond to one revolution of the tire, the number of pulses corresponding to one revolution must be examined in advance. In addition, since the number of pulses corresponding to one revolution corresponds to an integer multiple, a method of performing correction of a fraction of an integer by comparing with distance measurement data obtained by a GPS unit in the car navigation apparatus is also effective.

According to the above-mentioned embodiment, the problems of the present invention can be solved. That is, the magnetic sensor 14 has a very high sensitivity since it uses MI elements, and is free from changes in state due to magnetization unlike in a flux gate sensor. Also, since the magnetic sensor 14 is set in the vicinity of the rear tire in the cabin or trunk room of the vehicle, it can be easily set and can satisfactorily detect the magnetic field from the tire. Since the above-mentioned differential detection, and the peak detection and effective peak determination by the microcomputer 30 are performed, the influences of disturbance magnetic fields can be eliminated, and the revolution or revolution speed of the tire can be accurately detected.

In this embodiment, the MI elements are used as the magnetic detection elements. However, any other magnetic detection elements may be used as long as they have high sensitivity.

Finally, the measurement results of the traveled distance after a 2,000 cc passenger vehicle with the revolution detection apparatus of this embodiment traveled 10 km in an urban area will be described below.

In the test, since the vehicle travels in the urban area, it repeats stop-and-go, and its speed changes considerably. Note that the diameter of each tire of the test vehicle is 60 cm, and the vehicle travels 1.8 m per revolution of the tire.

The measurement result indicated 21,982 as the number of pulses output from the abovementioned arrangement shown in FIG. 8, and since two pulses were output per revolution, the traveled distance was measured to be 9.782 km. Measurement errors are about 2.2%; therefore, the precision required for the self-contained navigation of the car navigation apparatus can be assured even in an urban area where the vehicle speed changes and the vehicle suffers many disturbance magnetic fields.

As can be seen from the above description, according to the above embodiment, in the tire revolution detection method of detecting the revolution of a tire by detecting the magnetic field generated by the tire of the vehicle using a magnetic sensor, a tire that has a steel belt inside its outer circumferential portion is used, a magnetic sensor including a pair of magnetic detection elements (e.g., MI elements) which are arranged so that their magnetic detection directions become parallel to each other or series each other is set in the vicinity of a rear tire in a cabin or trunk room of the vehicle, changes in magnetic field upon revolution of the tire are detected by a differential detection of the pair of magnetic detection elements, and the revolution of the tire is detected based on the differential detection output. With this method, the sensor can be easily set, and magnetic detection of the tire revolution can be satisfactorily attained at high sensitivity. Also, according to this method, the car navigation system of this embodiment need not be connected to a vehicle speed signal terminal of the vehicle main body unlike in the conventional car navigation system, and as a consequence, the need for connection labor and high connection cost can be obviated.

Also, in the tire revolution speed detection method in the above embodiment, the tire revolution detection method of the present invention is used, a peak, a potential difference from the immediately preceding peak of which is equal to or larger than a predetermined threshold value, among a plurality of peaks present in the output waveform of the differential detection is detected as an effective peak, which is effective for tire revolution detection, and the tire revolution speed is calculated based on the number of detected effective peaks. Hence, the influences of the disturbance magnetic fields can be nearly completely eliminated, detection can be attained independently of the revolution speed of the tire, and tire revolution speed detection with small errors can be realized. For example, when this method is applied to traveled distance measurements of a vehicle, errors can be reduced to 3% or less.

Furthermore, the above-mentioned embodiment can provide a tire revolution detection apparatus which can satisfactorily perform tire revolution detection using some components of its arrangement or the entire arrangement as the magnetic sensor in the tire revolution detection method of the present invention, and the car navigation system market is expected to expand.

As can be easily understood from the above description, the present invention does not require any connections to a vehicle speed signal terminal of the vehicle main body unlike in the conventional car navigation system, and hence, the present invention can obviate the need for connection labor and high connection cost. Hence, the user can easily attach the car navigation system to a vehicle.

As many apparently widely different embodiments of the present invention can be made without departing from the spirit and scope thereof, it is to be understood that the invention is not limited to the specific embodiments thereof except as defined in the appended claims.

What is claimed is:

1. A tire revolution detection method for detecting a revolution of a tire provided to a vehicle, comprising the steps of:

using, as the tire, a tire which includes a steel belt embedded in an inner side circumferential portion of the tire, the steel belt generates a magnetic field;

setting magnetic field detection means for detecting the magnetic field of the steel belt in the vicinity of the tire inside the vehicle wherein the magnetic field detection means is set or arranged in an inner portion of the vehicle and in the vicinity of the tire, a body panel member being placed between the said magnetic field detection means and the tire; and detecting revolution of the tire by detecting a change in magnetic field upon revolution of the tire by said magnetic field detection means;

wherein said steel belt is arranged on the inner side of a tire which is not steered by a steering operation.

2. A tire revolution detection method for detecting a revolution of a tire provided to a vehicle, comprising the steps of:

using, as the tire, a tire which includes magnetic field generation means for generating a magnetic field;

setting magnetic field detection means for detecting the magnetic field generated by said magnetic field generation means inside the vehicle; and detecting revolution of the tire by detecting a change in magnetic field upon revolution of the tire by said magnetic field detection means, wherein said magnetic field generation means is arranged on a side of a rear tire, and said magnetic field detection means is arranged in the vicinity of a tire housing in a rear trunk of the vehicle.

3. A tire revolution detection apparatus for detecting a revolution of a tire provided to a vehicle, comprising:

magnetic field generation means, provided in an inner side circumferential portion of the tire, for generating a magnetic field; and magnetic field detection means for detecting the magnetic field generated by said magnetic field generation means, wherein said magnetic field detection means is arranged in the vicinity of the tire inside the vehicle, such that the magnetic field detection means is set or arranged in an inner portion of the vehicle and in the vicinity of the tire, a body panel member being placed between the said magnetic field detection means and the tire; and wherein said magnetic field generation means is arranged on the inner side of a tire which is not steered by a steering operation.

4. A tire revolution detection apparatus for detecting a revolution of a tire provided to a vehicle, comprising:

magnetic field generation means, provided in an inner circumferential portion of the tire, for generating a magnetic field; and magnetic field detection means for detecting the magnetic field generated by said magnetic field generation means, wherein said magnetic field detection means is arranged inside the vehicle in the vicinity of the tire, and wherein said magnetic field generation means is arranged on a side of a rear tire, and said magnetic field detection means is arranged in the vicinity of a tire housing in a rear trunk of the vehicle.

5. A tire revolution detection method for detecting revolution of a tire by detecting a magnetic field generated by the tire of a vehicle using a magnetic sensor, comprising the steps of:

using, as the tire, a tire which includes a steel belt embedded in an inner circumferential portion of the tire;

setting the magnetic sensor including a pair of magnetic detection elements, which are arranged to be parallel or series to the magnetic detection directions in order to detect a change in magnetic field of a same direction by said pair of magnetic detection elements and reduce a noise to the magnetic field, in the vicinity of a rear tire in a cabin or trunk room of the vehicle so that the magnetic field detection means detects the magnetic field generated by the tire; and detecting a change in magnetic field upon revolution of the tire by said pair of magnetic detection elements, and detecting the revolution of the tire of the basis of an output of the detection, wherein an interval between said pair of magnetic detection elements is within a range from 2 cm to 20 cm.

6. The method according to claims 5, wherein said magnetic detection elements comprise magnetic impedance elements.

7. The method according to claim 6, wherein an interval between said pair of magnetic detection elements is within a range from 2 cm to 20 cm.

8. A tire revolution detection method for detecting revolution of a tire by detecting a magnetic field generated by the tire of a vehicle using a magnetic sensor, comprising the steps of:

using, as the tire, a tire which includes a steel belt embedded in an inner circumferential portion of the tire;

setting the magnetic sensor including a pair of magnetic detection elements, which are arranged to be parallel or series to the magnetic detection directions in order to detect a change in magnetic field of a same direction by said pair of magnetic direction elements and reduce a noise to the magnetic field, in the vicinity of a rear tire in a cabin or trunk room of the vehicle;

detecting a change in magnetic field upon revolution of the tire by said pair of magnetic detection elements;

detecting a peak, a potential difference from an immediately preceding peak, which is not less than a predetermined threshold value, among a plurality of peaks present in an output waveform detected, as an effective peak which is effective for tire revolution detection; and calculating the revolution speed of the tire on the basis of the number of detected effective peaks.

9. The method according to claim 8, wherein the threshold value is set to be within a range from 10% to 90% of a maximum interpeak potential difference measured in advance.

* * * * *